April 9, 1968

L. J. GREER ETAL 3,376,971

FEED BLENDER AND GRINDER

Filed Oct. 31, 1966

INVENTORS.
Larry J. Greer
Theodore H. Grau
John McCloskey
Ralph J. McGinty
Robert Rousser BY Hovey, Schmidt, Johnson & Hovey.
ATTORNEYS.

April 9, 1968 L. J. GREER ETAL 3,376,971
FEED BLENDER AND GRINDER
Filed Oct. 31, 1966 3 Sheets-Sheet 2
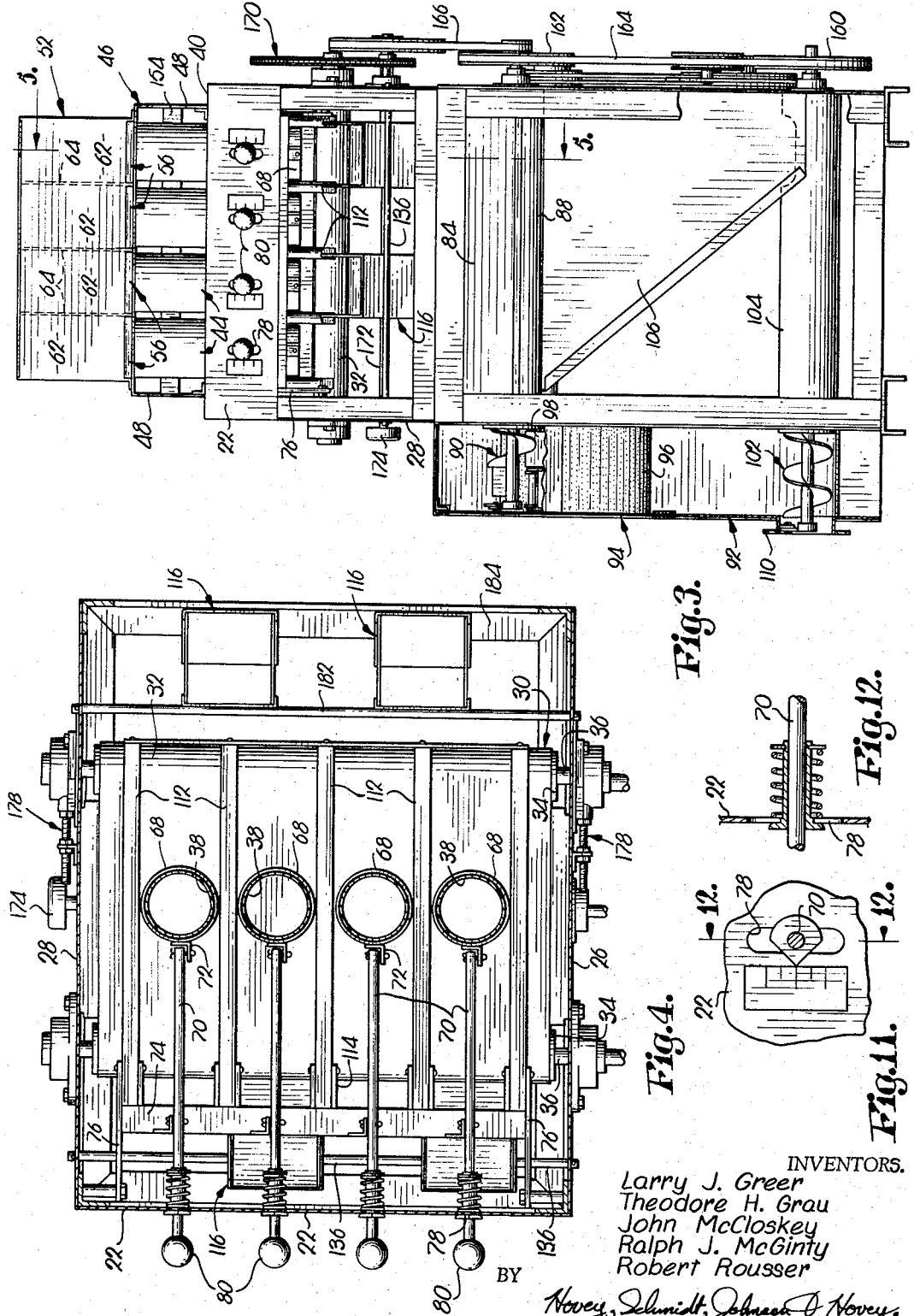
INVENTORS.
Larry J. Greer
Theodore H. Grau
John McCloskey
Ralph J. McGinty
Robert Rousser
BY
Hovey, Schmidt, Johnson & Hovey
ATTORNEYS.

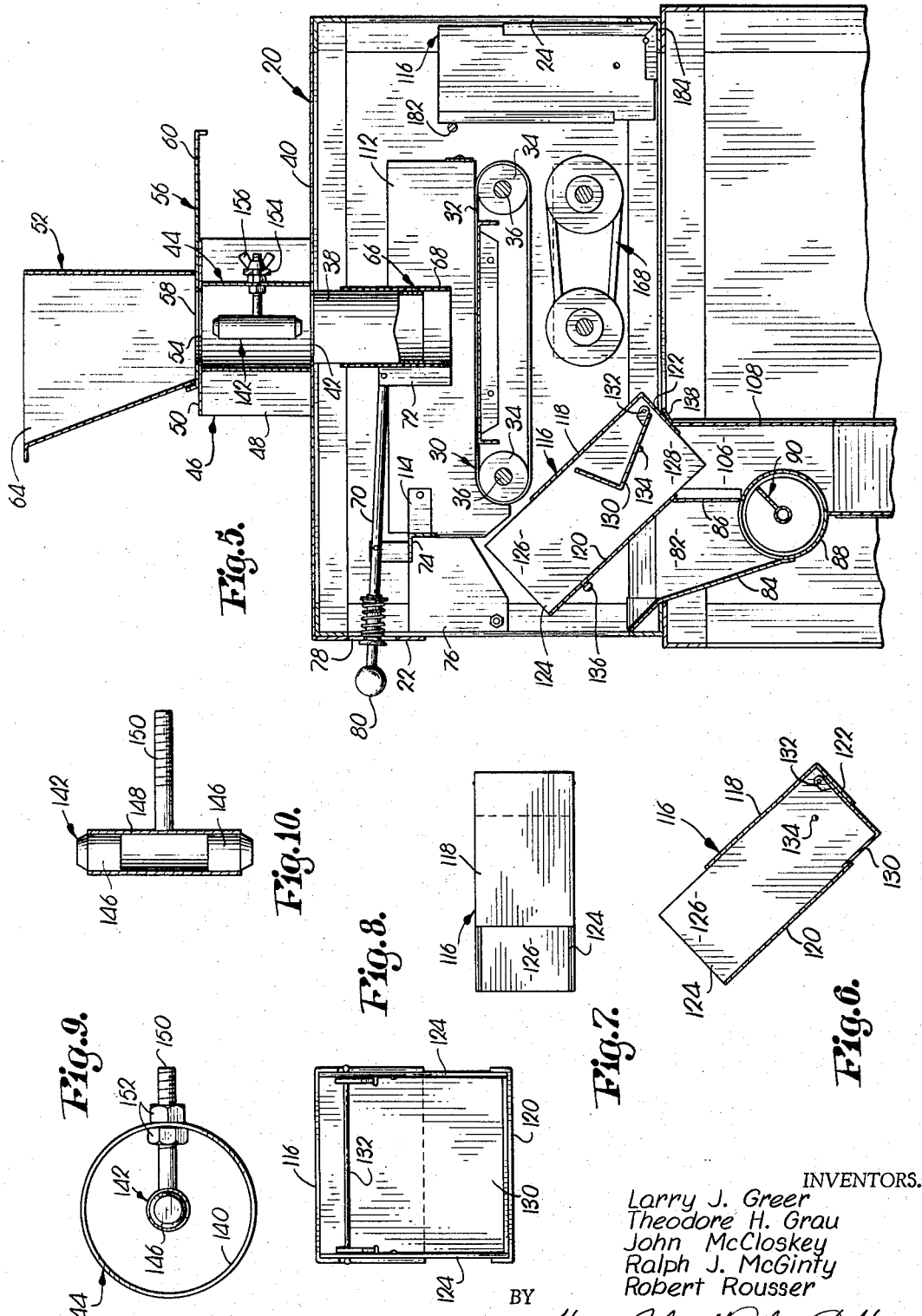

United States Patent Office 3,376,971
Patented Apr. 9, 1968

3,376,971
FEED BLENDER AND GRINDER
Larry J. Greer, Salina, Kans., Theodore H. Grau, Columbus, Nebr., and John McCloskey, Ralph J. McGinty, and Robert Rousser, Salina, Kans., assignors to The Wyatt Manufacturing Co., Inc., Salina, Kans., a corporation of Kansas
Filed Oct. 31, 1966, Ser. No. 590,646
2 Claims. (Cl. 198—68)

ABSTRACT OF THE DISCLOSURE

A feed blender and grinder including and endless belt conveyor provided with longitudinally extending dividers separating the conveyor for advancing a plurality of streams of feed material toward a discharge end overlying a receiver for movement of the material into a grinding mill. A second receiver disposed below and at an angle from the conveyor discharge end by-passes the mill. A plurality of combination material diverter and sampling cans of tubular construction may be placed in saddled relationship on elongated support elements extending transversely across the discharge end of the conveyor for diverting any of said streams of material into the by-pass receiver. An L-shaped gate in the cans is shiftable to a position for collecting material from the streams in the can. A series of tubular conduits having an axially disposed, magnetic element conducts material to the conveyor and separates any ferro-magnetic material therefrom.

---

This invention relates to material handling apparatus and, more particularly, to improved apparatus for blending and grinding dry, flowable materials such as the constituents of animal feed rations.

The preparation of feed rations often involves the mixing of a variety of feeds, some of which may require comminution to be properly suited for maximum palatability and assimilation by the animal. Comminution of certain portions of the ration is especially desirable in animal feeds where one or more of the basic ingredients such as feed grains is most commonly available in whole kernal form. The wide variety of grains available, together with the desirability of tailoring the ration to the particular animals for which the ration is prepared and the wide range of supplements and additives which are required for particular rations, requires that the mill be capable of producing any one of a large range of available feed mixes at any given time. To this end, it is highly important that the mill be quickly and easily adjustable by relatively unskilled labor for producing whatever ration may be required.

Accordingly, it is the primary object of this invention to provide blending and grinding apparatus which is highly versatile in producing rations blended and comminuted in the proportions which may be required by the livestock feeder.

It is another important object of the invention, and attainable in the achievement of the foregoing object, to provide a mill having novel means for diverting any selected stream of material flowing through the mill past the grinder for blending into the ration without comminution.

Still another object of the instant invention is to provide a mill wherein the diverter may also serve for measuring the flow of any selected stream of material to insure proper calibration of the metering structure, all without undue interference with the normal operation of the apparatus and without need for auxiliary equipment.

It is a further object of this invention to provide a mill having means for readily removing foreign matter from the material flowing through the mill while the mill is operating and without the necessity for extensive dismantling of the apparatus or costly periods of shutdown.

These and other important objects of the present invention will be further explained or become apparent in the following description and claims.

In the drawings:

FIG. 3 is a front elevational view thereof, parts being broken away to reveal details of construction;

FIG. 4 is a horizontal, cross-sectional view taken along line 4—4 of FIG. 1;

FIG. 5 is a vertical, cross-sectional view taken along line 5—5 of FIG. 3;

FIG. 6 is a vertical, cross-sectional view through one of the material diverter and calibration cans of the mill, the can being shown with its gate in position to collect samples of material;

FIG. 7 is a top plan view of the can shown in FIG. 6;

FIG. 8 is an enlarged end view of the can;

FIG. 9 is an enlarged, top plan view of one of the magnet assemblies of the mill;

FIG. 10 is a vertical, cross-sectional view through one of the magnet units illustrating the magnets and mounting means;

FIG. 11 is an enlarged, fragmentary, elevational view of one of the control knobs and its associated calibration index; and FIG. 12 is a vertical, cross-sectional view taken along line 12—12 of FIG. 11.

Figures 1, 2:
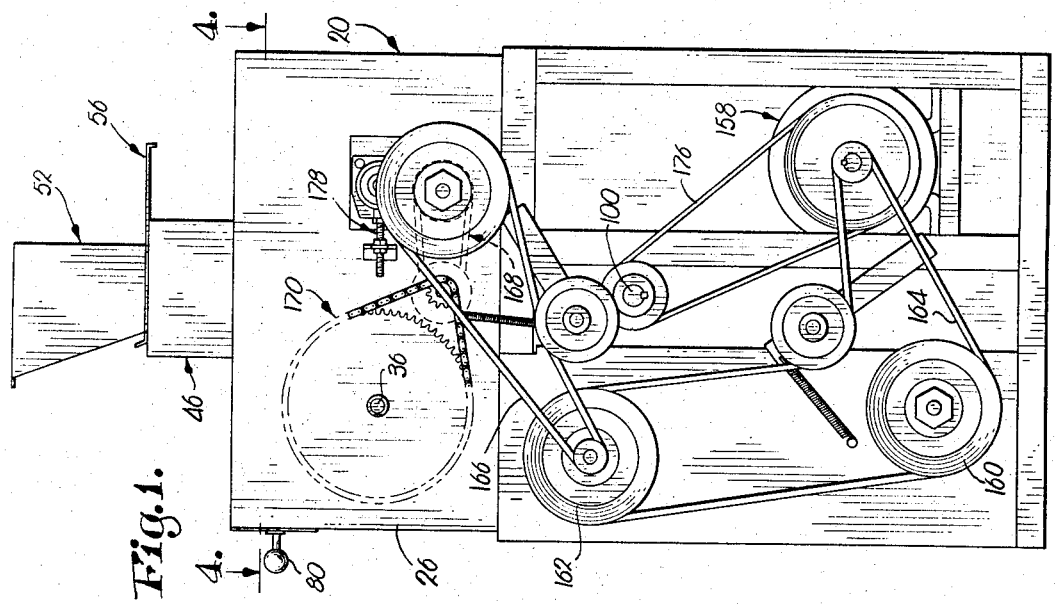
FIGURE 1 is a side elevational view of a mill embodying the principles of the instant invention.
FIG. 2 is a side elevational view thereof illustrating the side opposite to that shown in FIG. 1, parts being broken away to reveal details of construction.

A mill embodying the principles of this invention is broadly designated by the numeral 20 and includes a housing having a front wall 22, a rear wall 24, and sidewalls 26 and 28. A conveyor 30 comprising a relatively wide, endless flexible belt 32 is mounted on rollers 34 carried by shafts 36 journalled in sidewalls 26 and 28. Belt 32 extends substantially across the housing of mill 20 between walls 26 and 28 and underlies a series of side-by-side, vertically extending feed conduits 38. Each conduit 38 is carried by a top wall 40 of mill 20 and communicates through an aperture 42 with a removable conduit section 44 which is of slightly greater diameter than aperture 42 so that section 44 is supported in circumscribing relationship to aperture 42 on top wall 40 of mill 20.

A superstructure 46 comprises a pair of spaced, upwardly extending legs 48 secured to the top wall 40, and an integral, horizontally extending bight 50 in turn, supports a hopper 52 in overlying relationship to the conduit section 44. Bight 50 is provided with a series of side-by-side apertures 54 aligned with the tubular conduit sections, there being an aperture 54 for each section 44 respectively. A slide 56 for each section 44 is mounted on bight 50 directly beneath hopper 52 for horizontal shifting movement between hopper 52 and bight 50.

Slide 56 includes a section having an aperture 58 and a blank section 60 so that hopper 52 is placed in communication with conduit section 44 through the aperture 58 in slide 56 when the latter is in the position illustrated in FIG. 5. On the other hand, when slide 56 is shifted to the left, as viewed in FIG. 5, the blank section 60 of slide 56 overlies the aperture 54 in bight 50, thereby precluding communication of hopper 52 with conduit section 44. It will be understood that hopper 52 may be divided into a plurality of side-by-side sections 62 by dividers 64, there being a section 62 for each of the conduit sections 44 respectively. Manifestly, each section 62 is provided with its respective slide 56 to permit selective gravitation of material such as feed grains or the like from any section 62 or any comibnation thereof through the respective sections 44 and conduits 38, thence onto the upper surface of conveyor belt 32.

The rate of flow of material from each of the bin sections 62 onto belt 32 is controllable by means of a vertically shiftable valve 66 comprising an outer conduit section 68 telescoped over the lowermost extremity of conduit 38 for vertical shifting toward or away from the upper surface of belt 32.

A lever 70 pivotally secured to section 68 by means of a bracket 72 is also pivotally mounted on a horizontally extending support 74 which is secured to sidewalls 26 and 28 through brackets 76. Lever 70 extends through a slot 78 in front wall 22 of the mill and terminates in a control knob 80. Thus, up or down movement of control knob 80 shifts section 68 toward or away from the upper surface of belt 32 which, in turn, controls the rate of flow of feed materials onto the belt. The forward end of belt 32 overlies a trough 82 extending transversely near the front of mill 20. Through 82 is defined by an inclined planel 84 and a vertical panel 86, the lower portion of trough 82 being in open communication with a tubular conduit 88 which houses a transversely extending screw conveyor 90. The latter extends outwardly beyond sidewall 28 of mill 20 and into a housing extension 92 adjacent sidewall 28. A hammer mill broadly designated 94 is housed in extension 92 and includes a screen member 96 disposed to receive feed material from conveyor 90, and a plurality of hammers 98 mounted on a rotatable shaft 100 which extends through mill 20.

A second screw conveyor 102 adjacent the bottom of housing extension 92 underlies hammer mill 94 and extends through a tubular conduit 104 which opens into communication with an irregularly-shaped trough 106 disposed between panel 86 and a back panel 108. Thus, trough 106 extends transversely across mill 20 immediately to the rear of trough 82, and it will be noted that the upper open end of trough 106 is not disposed directly beneath the forwardmost end of conveyor belt 32. Thus, during operation of conveyor 30, the material on the upper surface of belt 32 is discharged directly into trough 82 but not normally into trough 106.

Conveyor 106 is adapted to be coupled with a discharge conduit (not shown) or other means for conveying material from mill 20 after the material has passed through the mill. To this end, a flanged coupling 110 is provided in the sidewall of housing extension 92 proximal the lowermost portion of the latter.

It will be understood that each of the material inlet conduits 38 is provided with its associated section 68 and control lever 70 for adjusting the amount of material gravitating from each bin section 62 to belt 32. Moreover, horizontal dividers 112 are mounted on supports 74 by bracket 114, there being a divider 112 between each of the conduits 38 to maintain the material flowing from hopper 52 in respective streams of flow onto belt 32. If the materials in one or more of such streams of flow comprise grain or the like which is to be further comminuted in order to adapt the material as a constituent for the ration of animals, the streams of such materials are permitted to flow off the forward end of belt 32 and into trough 82 where conveyor 90 transfers the material into hammer mill 94.

The material is comminuted in hammer mill 94 and gravitates through screen 96 into the bottom of housing extension 92 for further transfer by conveyor 102 to any suitable means for storing the ration or delivering the same to the animals. On the other hand, if one or more of the streams of flow does not require comminution, but is to be merely blended with the other ingredients passing through mill 20 to comprise a portion of the feed ration, a diverter is interposed in such streams of flow between conveyor 30 and trough 82 to bypass the latter and divert the material into the open upper end of trough 106. The diverter means to accomplish this purpose forms an important part of this invention and is illustrated particularly in FIGS. 5–8.

The divider 116 includes a transversely polygonal body comprised of a top 118, a bottom 120, and an end 122. A pair of sidewalls 124 extend between top 118 and bottom 120. The end of diverter 116 opposite end 122 is open, and top 118 does not extend the full length of sides 124 to present an open inlet 126 at the upper end of diverter 116. Similarly, end 122 and bottom 120 of diverter 116 are spaced apart to provide an open corner outlet 128 opposite inlet 126. An L-shaped closure 130 is hinged by pin 132 extending between sides 124 whereby closure 130 may be positioned as illustrated in FIG. 5 to provide for free passage of material between inlet 126 and outlet 128. A detent 134 in each of the sidewalls 124 serves to releasably lock closure 130 in the position thereof illustrated in FIG. 5. Conversely, closure 130 may be swung around pivot 132 to the position thereof illustrated in FIG. 6 for retaining material which gravitates into diverter 116 as will be hereinafter explained.

An elongated rod 136 extends transversely of mill 20 between side walls 26 and 28 and in vertically spaced relationship above the open upper mouth of the material receiver or trough 82 as shown best in FIG. 5. Rod 136 is positioned to support diverter 116 in the position illustrated in FIG. 5 with bottom 120 resting against rod 136. Similarly, an inclined support element 138 at the uppermost edge of panel 108 is positioned so that end 122 of diverter 116 may rest thereon. Thus, diverter 116 is firmly positioned as illustrated in FIG. 5 with elements 136 and 138 disposed in generally saddled relationship across one corner of diverter 116. This position permits the gravitation of material from the forward end of conveyor 30 into the tubular diverter 116 where it is directed into the open upper mouth of the material receiver or trough 106. Such material is not carried to the hammer mill by conveyor 90. Rather, further comminution of such material is avoided and the latter gravitates to the bottom of trough 106 where it enters conduit 104 to be carried by conveyor 102 to the outlet defined by coupling 110.

It will be understood by those skilled in the art that the dimensions of diverter 116 are chosen whereby each diverter 116 will accommodate one of the streams of material flowing from conveyor 30 and defined by the space between a pair of adjacent diverters 112. Thus, all of the material emanating from conveyor 30 may be deposited directly into trough 82 or all of the material can be diverted into trough 106. Further, any one or more of the streams of material can be selectively either permitted to flow into trough 82 or diverted into trough 106 as the requirements of the animal feeder may determine.

Diverter 116 also serves as a combination sample collector inasmuch as it is but necessary for the operator of mill 20 to move the closure 130 to the position thereof illustrated in FIG. 6 whereby the diverter 116 is immediately capable of retaining the material of the particular stream under which it is located. Thus, the diverter 116 serves as a can for calibrating the rate of flow of material in the particular flow stream. After a predetermined length of operation with the can in the position illustrated in FIG. 5, but with closure 130 in the position shown in FIG. 6, the can 116 may be removed wherein the quantity of material collected therein during such period of operation may be determined. The adjustment of the flow rate for that particular stream can, of course, be effected by operation of lever 70 through control knob 80 as heretofore described.

An additional important feature of this invention resides in the readily removable, novel conduit sections 44 which underlie the main hopper 52. The sections 44 comprise a tubular sidewall 140 and include a magnet assembly 142 for attracting any ferromagnetic material which may be entrained in the flow stream. It is, of course, important that such material be separated from the feed before the latter traverses mill 20 inasmuch as damage to mill 20 could occur and also, because of the danger to livestock from the presence of such materials in the ration.

Assembly 142 may include an elongated bar magnet which may be constructed as illustrated best in FIG. 10 wherein a pair of magnets 146 are mounted in a cylindrical tube 148 with a portion of each magnet 146 protruding from the ends of tube 148. A laterally extending mounting bracket 150 is threaded and extends through an aperture (not shown) inside wall 140 of conduit 44. Locking nuts 152 locate the assembly 142 in coaxial relationship to conduit 44 whereby the flow of feed around the magnet is substantially uniform and the magnet is in a position to extend maximum field of flux throughout the entire flow stream of material through conduit 44. Further, the substantial length given to assembly 142 by virtue of the length of the bar magnet for the vertical spacing between the magnets 146 insure that the material gravitating through conduit 44 will have the magnetic forces imparted for a sufficient length of time to attract the ferromagnetic material contained in the flow stream.

The entire unit comprising the assembly 142 mounted in conduit 44 is retained in disposition beneath its respective upper section 62 by virtue of a transversely extending retainer bar 154 extending between legs 48 adjacent hopper 52. Thus, section 44 can be inserted in place with bracket 150 extending through an aperture (not shown) in bar 154.

A wing nut 156 may be utilized for releasably securing section 44 in place and will permit ready removal of the entire unit for cleaning as may be desired. Slide 56 can be moved to its closed position beneath hopper section 62 during such cleaning operation. Accordingly, the cleaning or removal of ferromagnetic material from section 44 may take place even during periods of operation of mill 20.

Referring particularly to FIG. 1, mill 20 is operated by a prime mover 158 which is operably coupled to a sheave 160 for driving conveyor 102 and a sheave 162 for driving conveyor 90 by an endless flexible belt 164. Power is taken off by belt 166 from conveyor 90 to drive a variable speed drive unit 168 which is, in turn, coupled to the conveyor 30 by means of a chain drive unit 170. The unit 168 is of conventional construction and the variations of speed obtainable through unit 168 may be selectively varied by means of a shaft 172 (FIG. 3) operable by a control knob 174 located outside mill 20. Prime mover 158 is also coupled through a belt 176 to the main shaft 100 of hammer mill 94. The tension of conveyor belt 32 may be varied by means of belt tighteners 178 located on opposite sides of mill 20.

It will be understood by those familiar with this art that mill 20 can be provided with suitable covering screens or housings as may be required to prevent inadvertent contact with any of the moving parts of mill 20, and to enhance the appearance of the latter. Further, suitable clean-out doors such as door 180 illustrated in FIG. 2, may be provided to obtain access to certain of the operating parts of the mill.

The novel diverter cans 116 described above eliminate the necessity for complicated valves or the like which have heretofore been thought necessary for selectively bypassing certain portions of feed mills to effect blending of the various components of the animal feed ration where comminution of such portions is to be avoided. Further, the novel support elements for maintaining the diverter can in its proper position permits selective insertion or removal of the cans in whatever flow stream may be desired anywhere along the transverse width of the belt conveyor 30. It has been found that the saddled arrangement with the support elements with respect to one corner of the cans, eliminates any necessity for auxiliary fastening means to secure the cans in place. On the contrary, once placed in a given position along the support elements, the cans remain in place despite inherent vibration of the machine during operation.

Further, the novel cans eliminate the necessity for conveyor 30 to run in reverse as has been heretofore conventional during calibration operations. It will be recognized that conveyor 30 runs in its normal manner while any of the flow streams are being collected to measure for proper calibration of the machine.

A bar 182 extends transversely between sidewalls 26 and 28 at the rear of conveyor 30 and, with a transversely extending angle iron 184, serves as a convenient storage support for maintaining diverter cans 116 while not in use. In this storage position, the cans are readily accessible to the operator of mill 20 when it becomes necessary either to divert a stream of material to bypass hammer mill 94, or to collect a sample of the flow stream to measure for calibration.

Having thus described the invention, what is claimed as new and desired to be secured by Letters Patent is:

1. In a feed blender and grinder:
conveyor means for advancing a plurality of different feed materials to a zone of gravitation and for discharging the materials into side-by-side streams gravitating within the zone;
a pair of elongated material receivers extending along said zone therebeneath,
one of the receivers being disposed within the path of gravitation of said materials for flow of the latter directly thereinto from said conveyor means,
the other receiver being outside said path of gravitation;
elongated, tubular chute having an inlet and an outlet, said structure being movable into any one of said streams within said path of gravitation transversely of the latter for diverting a selected one of said streams of said materials into the other receiver; a plurality of chute-engaging elements extending substantially horizontally within an area between the conveyor means and the receivers for movement of the chute along the elements and for supporting the chute on an incline when the same is in said path of gravitation, said chute being transversely polygonal with the inlet being at one corner of the chute, the outlet being at a second corner of the chute diagonally opposed to the inlet, said elements being disposed to saddle the chute with the second corner depending from the elements, there being an element beneath said bottom removed from the second corner; and a closure for said outlet adapting the chute for collection of a sample of any of said streams of materials.

2. A combination material diverter and sample collector for material-handling apparatus comprising:
an elongated, transversely polygonal tube adapted for disposition on an incline within the path of travel of a stream of gravitating material, said tube being provided with a bottom and an end, said tube having an inlet at its normally uppermost end and an outlet at its normally lowermost end whereby the material is diverted laterally of its path of gravitation when the chute is disposed to place its inlet into a position receiving the gravitating material, the outlet being partially in the bottom and partially in the end; and a gate shiftable within the chute to a position closing the outlet when a sample is to be taken of the material, said gate being L-shaped, presenting a first leg adapted to close the outlet at said bottom and a second leg adapted to close said outlet at said end.

References Cited

UNITED STATES PATENTS

| | | | |
|---|---|---|---|
| 559,213 | 4/1896 | Richards | 193—31 |
| 1,287,711 | 12/1918 | Lichtenberg | 193—21 |
| 1,577,218 | 3/1926 | Fletcher | 198—58 X |
| 1,732,463 | 10/1929 | Fleges | 193—31 |
| 3,145,644 | 8/1964 | Johnson | 198—58 X |
| 3,252,328 | 5/1966 | Huntington | 73—423 |
| 3,318,228 | 5/1967 | Barnard | 99—235 |

ANDRES H. NIELSEN, *Primary Examiner.*

EVON C. BLUNK, *Examiner.*

M. L. AJEMAN, *Assistant Examiner.*